(12) United States Patent
Migneco et al.

(10) Patent No.: US 11,163,270 B2
(45) Date of Patent: Nov. 2, 2021

(54) VEHICLE OCCUPANT DATA COLLECTION AND PROCESSING WITH ARTIFICIAL INTELLIGENCE

(71) Applicant: LEAR CORPORATION, Southfield, MI (US)

(72) Inventors: Francesco Migneco, Saline, MI (US); David Gallagher, Sterling Heights, MI (US); Mark Weaver, Auburn Hills, MI (US); Katie Rimell, Redditch (GB)

(73) Assignee: Lear Corporation, Southfield, MI (US)

( * ) Notice: Subject to any disclaimer, the term of this patent is extended or adjusted under 35 U.S.C. 154(b) by 145 days.

(21) Appl. No.: 16/507,160

(22) Filed: Jul. 10, 2019

(65) Prior Publication Data

US 2021/0011437 A1 Jan. 14, 2021

(51) Int. Cl.

| G05B 13/00 | (2006.01) |
|---|---|
| G05B 13/02 | (2006.01) |
| G07C 5/08 | (2006.01) |
| F24F 11/65 | (2018.01) |
| F24F 11/30 | (2018.01) |
| F24F 11/64 | (2018.01) |
| H04L 29/08 | (2006.01) |

(52) U.S. Cl.
CPC .......... *G05B 13/0265* (2013.01); *F24F 11/30* (2018.01); *F24F 11/64* (2018.01); *F24F 11/65* (2018.01); *G07C 5/085* (2013.01); *H04L 67/12* (2013.01)

(58) Field of Classification Search
CPC .... G05B 13/0265; G07C 5/085; G07C 5/008; G07C 5/0858; F24F 11/65; F24F 11/30; F24F 11/64; H04L 67/12; H04L 67/34; G06N 20/00; H04W 4/40; G06F 16/90; G06Q 10/04
See application file for complete search history.

(56) References Cited

U.S. PATENT DOCUMENTS

| 7,802,246 B1* | 9/2010 | Kennedy | G06F 8/61 717/173 |
|---|---|---|---|
| 8,186,230 B1* | 5/2012 | Kelley | G01F 1/42 73/861.42 |
| 9,135,803 B1 | 9/2015 | Fields et al. | |
| 9,646,428 B1 | 5/2017 | Konrardy et al. | |
| 2009/0144909 A1* | 6/2009 | Skinner | A61G 7/05776 5/713 |
| 2010/0217478 A1* | 8/2010 | Zhang | G07C 5/006 701/31.4 |

(Continued)

OTHER PUBLICATIONS

Shah, Swati. Product marketing in the era of Internet of Things. Diss. Massachusetts Institute of Technology, 2018. (Year: 2018).*

(Continued)

*Primary Examiner* — Michael D Masinick
(74) *Attorney, Agent, or Firm* — Brooks Kushman P.C.

(57) ABSTRACT

A server includes an interface, programmed to receive, from a vehicle, vehicle data indicative of vehicle status and user data indicative of usage of vehicle features by a user; and a processor, programmed to analyze the vehicle data and the user data using artificial intelligence (AI) logic to generate a comfort prediction for the user; and configure a comfort device associated with the user, external to the vehicle, using the comfort prediction.

20 Claims, 4 Drawing Sheets

(56) References Cited

U.S. PATENT DOCUMENTS

| | | | |
|---|---|---|---|
| 2013/0211669 A1* | 8/2013 | DePetro | B60N 2/002 |
| | | | 701/36 |
| 2013/0332104 A1* | 12/2013 | Russell | A61B 5/6893 |
| | | | 702/139 |
| 2014/0309790 A1* | 10/2014 | Ricci | G01C 21/3697 |
| | | | 700/276 |
| 2014/0310788 A1* | 10/2014 | Ricci | G06F 21/31 |
| | | | 726/6 |
| 2015/0065170 A1* | 3/2015 | Brisebois | H04W 4/023 |
| | | | 455/456.3 |
| 2015/0292985 A1* | 10/2015 | Yenni | G05B 23/0221 |
| | | | 702/182 |
| 2016/0129916 A1* | 5/2016 | Olsen | H04L 67/12 |
| | | | 701/36 |
| 2017/0024201 A1 | 1/2017 | Diedrich et al. | |
| 2017/0113664 A1 | 4/2017 | Nix | |
| 2017/0305349 A1* | 10/2017 | Naboulsi | B60R 1/025 |
| 2018/0203708 A1* | 7/2018 | Carey | G06F 21/31 |
| 2018/0319402 A1* | 11/2018 | Mills | B60W 30/10 |
| 2019/0106037 A1* | 4/2019 | Mankame | A47C 7/20 |
| 2019/0138293 A1* | 5/2019 | Shrivastava | G06F 8/36 |
| 2019/0146442 A1* | 5/2019 | Cirino | H04W 68/005 |
| | | | 700/9 |
| 2020/0216077 A1* | 7/2020 | Nolscher | H04W 76/14 |
| 2020/0252498 A1* | 8/2020 | Iyer | H04W 4/029 |
| 2021/0031786 A1* | 2/2021 | Gallagher | B60W 50/0098 |

OTHER PUBLICATIONS

"Automakers Embrace Over-the-Air Updates, but Can We Trust Digital Car Repair?", Consumer reports, Apr. 20, 2018 (Year: 2018).*

* cited by examiner

VEHICLE OCCUPANT DATA COLLECTION AND PROCESSING WITH ARTIFICIAL INTELLIGENCE

TECHNICAL FIELD

The present disclosure generally relates to a vehicle occupant data collection and processing system. More specifically, the present disclosure relates to a vehicle system for collecting occupant data and a server for analyzing the data using artificial intelligence (AI) technologies.

BACKGROUND

Many vehicles are provided with comfort features, such as heating, ventilation, and air conditioning (HVAC), seat massage, or the like. Sensors may be used to collect data for vehicle users and usage of those features. The data collected by sensors may be useful for vehicle manufacturers to determine the usage pattern of those features to optimize vehicle software update and improve design for future vehicles.

SUMMARY

In one or more illustrative embodiments of the present disclosure, a server includes an interface, programmed to receive, from a vehicle, vehicle data indicative of vehicle status and user data indicative of usage of vehicle features by a user; and a processor, programmed to analyze the vehicle data and the user data using artificial intelligence (AI) logic to generate a comfort prediction for the user; and configure a comfort device associated with the user, external to the vehicle, using the comfort prediction.

In one or more illustrative embodiments of the present disclosure, a method for a server includes receiving, from multiple vehicles, vehicle data indicative of vehicle status and user data indicative of usage of vehicle features of multiple users; analyze the vehicle data and the user data using an artificial intelligence (AI) logic to generate an analysis result indicative of a usage pattern of multiple vehicle features; and optimize a vehicle software update based on the analysis result.

In one or more illustrative embodiments of the present disclosure, a non-transitory computer-readable medium includes instructions that, when executed by a processor of a computer, cause the processor to query, with vehicles, vehicle data indicative of vehicle status and user data indicative of usage of vehicle features of multiple users from the vehicles; responsive to receiving, from multiple vehicles, the vehicle data and the user data, analyze the vehicle data and the user data using an artificial intelligence (AI) logic to generate an analysis result indicative a usage pattern of multiple vehicle features by the users; and output a warranty claim prediction based on the usage pattern of multiple vehicle features.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosure generally provides for a plurality of circuits or other electrical devices. All references to the circuits and other electrical devices and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for collecting vehicle data and vehicle user data via various sensors and store data in a storage. Vehicle data and user data may be uploaded to a cloud server for analysis to determine user comfort preference with which comfort devices (e.g. chairs, sofas or the like) separated from the vehicle may be configured, to provide a good user experience. Additionally, the comfort preference may be used to configure a comfort device within vehicles (e.g. another vehicle seat, or seat of another vehicle). Additionally, with data received from multiple vehicles and users, the cloud server may further analyze data collectively and determine usage patterns for various vehicle features, and therefore predict warranty claims, insurance disputes over certain period of time. Based on the user most frequent predicted patterns/preferences, the cloud server may optimize and improve vehicle software updates in an "off-the-shelf" manner and may perform customizations.

Figure 1:
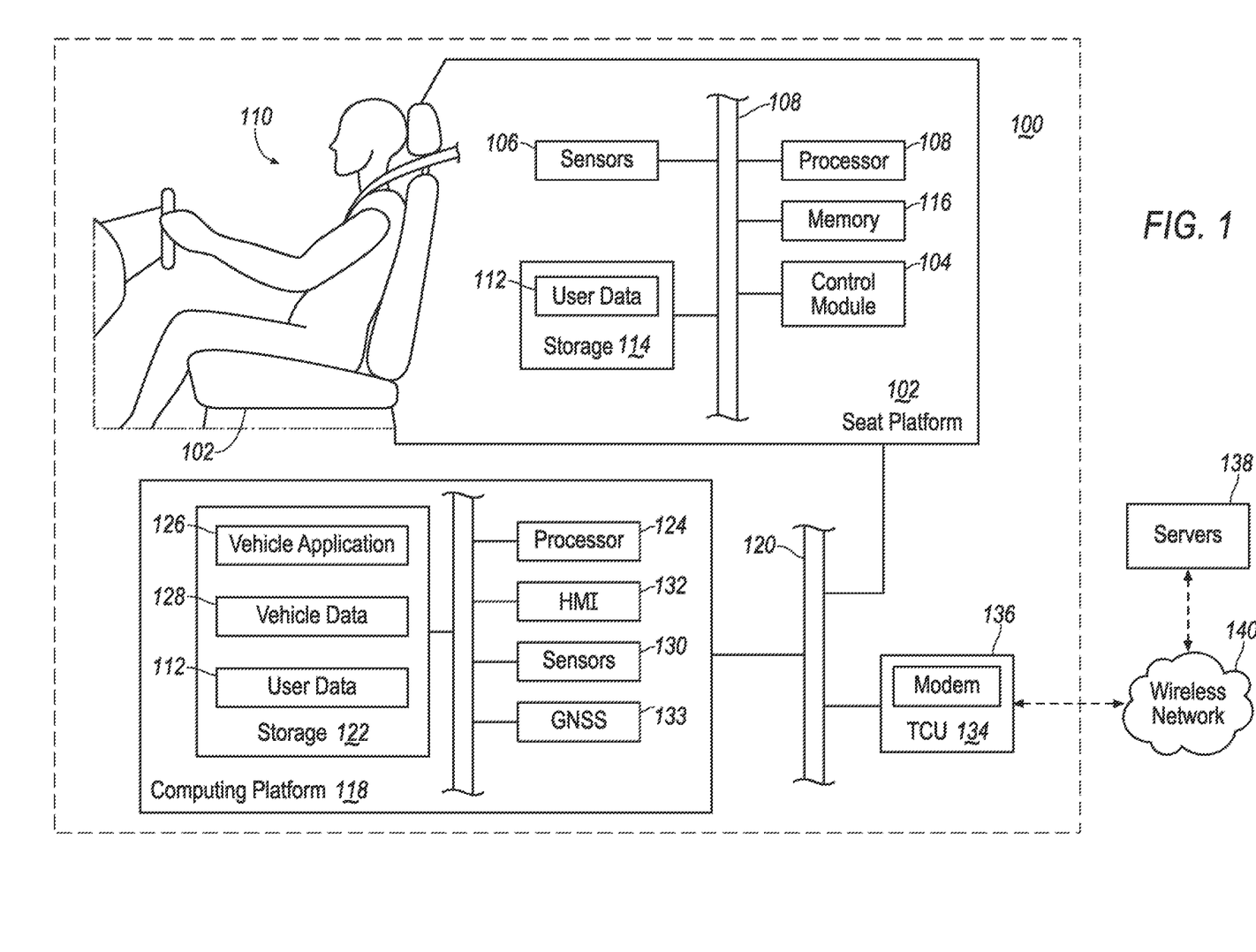
FIG. 1 illustrates an example block topology of a vehicle system of one embodiment of the present disclosure.

FIG. 1 illustrates an example diagram of a system 100 that may be used for the vehicle integration scheme. The vehicle (not shown) may include various types of automobile, crossover utility vehicle (CUV), sport utility vehicle (SUV), truck, recreational vehicle (RV), boat, plane, or other mobile machine for transporting people or goods. In many cases, the vehicle may be powered by an internal combustion engine.

As another possibility, the vehicle may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods.

The vehicle 100 may include one or more seats 102. As illustrated in FIG. 1, a seat platform 102 may include a control module 104 configured to control the operation of the seat platform 102 to provide various features such as seat angle adjustment, cooling/heating, massage or the like. The control module 104 may further include one or more sensors 106, in communication with the control module 104 via a seat network 108, configured to collect data of a vehicle user 106. The sensors 104 may include various types of sensors, including but not limited to, a pressure sensor, a piezoelectric-resistive sensor, or a Doppler radar sensor. These sensors 104 may be used to collect physical and/or anthropometric data of the user 106. Data collected by the sensors 104 may be sent to one or more processors 108 for processing and generating a user data 112. The user data may be transmitted to a seat storage 114 via a memory 116 for storage. The seat storage 114 may include a non-transitory storage medium configured to store the user data in a non-volatile manner. Additionally or alternatively, the sensor data and/or user data 112 may be sent to a computing platform 118 via a in-vehicle network 120 for processing and storage. The computing platform 118 may include a non-volatile storage 122 to store the user data 112 as received. The in-vehicle network 120 may include, but is not limited to, one or more of a controller area network (CAN), a local interconnect network (LIN) an Ethernet network, and a media-oriented system transport (MOST), as some examples.

The computing platform 118 may include a non-volatile storage to store the user data 120. The computing platform 118 may further include one or more processors 124 configured to perform instructions, commands, and other routines in support of the processes described herein. For instance, the computing platform 118 may be configured to execute instructions of vehicle application 126 stored in the storage 122 to provide perform sensor data processing features. Furthermore, the computing platform 118 may be configured to collect vehicle data 128 via one or more vehicle sensors 130 and store the vehicle data 128 in the storage 122. The vehicle data 128 may be indicative of various vehicle settings/status (e.g. HVAC settings, location data or the like) associated with the vehicle 100. It is noted that the term sensors is used as a general term in the present disclosure and may include any device/component provided with sensing or signal collection capabilities to collect data related to any aspect of vehicle operation or condition. For instance, sensors 130 may include a speed sensor, a vibration sensor, a camera, a seatbelt sensor, a light sensor or the like. The computing platform 118 may be provided with various features allowing the vehicle occupants/users to interface with the computing platform 118. For example, the computing platform 118 may output to and receive input from human-machine interface (HMI) controls 132 configured to provide for user interaction with the vehicle. As an example, the computing platform 118 may interface with one or more buttons (not shown) or other HMI controls configured to invoke functions on the computing platform 118 (e.g., steering wheel audio buttons, a push-to-talk button, instrument panel controls, etc.). The computing platform 118 may further include a global navigation satellite system (GNSS) controller 133 configured to communicate with multiple satellites and calculate the location of the vehicle 100. The GNSS controller 133 may be configured to support various current and/or future global or regional location systems such as global positioning system (GPS), Galileo, Beidou, Global Navigation Satellite System (GLONASS) and the like.

The seat platform 102 and the computing platform 118 may be further configured to communicate with a telematics control unit (TCU) 134 via the in-vehicle network 120. The TCU 134 may include one or more wireless modem 136 configured to connect the TCU 134 to a remote server 138 via a wireless network 140 to provide network connectivity. It is noted that the term wireless network and server are used as general terms in the present disclosure and may include any computing network involving carriers, router, computers, controllers or the like configured to communicate, store data and perform data processing functions and facilitate communication between various entities.

Figure 2:
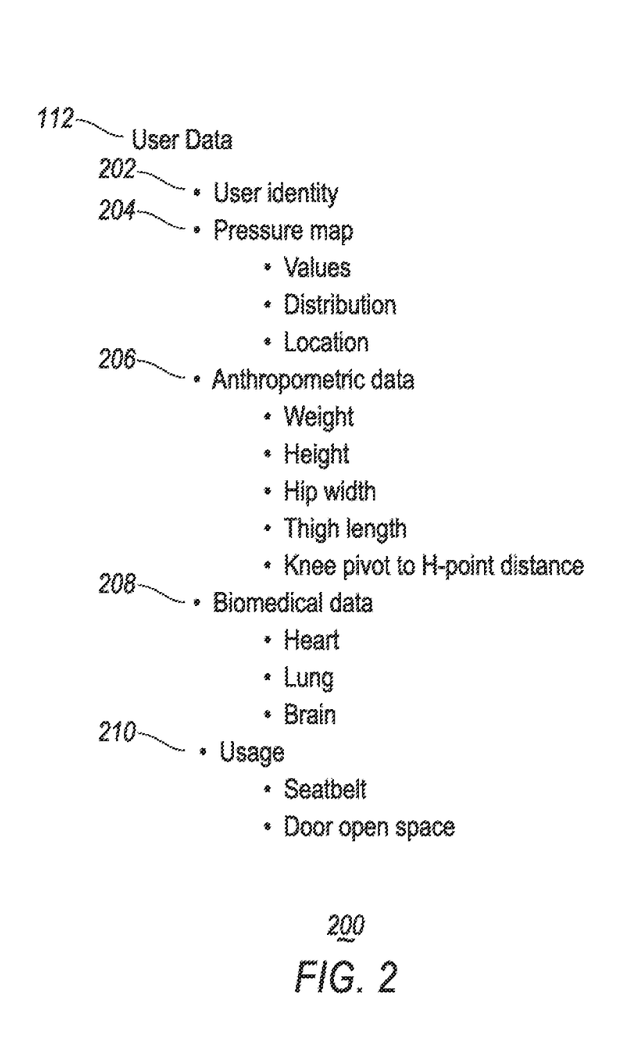
FIG. 2 illustrates an example diagram for user data of one embodiment of the present disclosure.

Referring to FIG. 2, an example diagram 200 for user data of one embodiment of the present disclosure is illustrated. With continuing reference to FIG. 1, the user data 112 may include multiple entries to record various aspects of the user and his/her usage pattern. For instance, the user data 112 may include a user identity entry to identify the user 110. One vehicle 100 may be shared by multiple users and identification of the users may be important. The computing platform 118 may be configured to identify the user 110 via various means such biometric identification (e.g. fingerprint or facial recognition) using a fingerprint reader or camera 130. Additionally or alternatively, the computing platform 118 may be further configured to identify the user 110 using a mobile device (not shown) associated with the user 110 and connected to the computing platform 118 via a wired or wireless connection. The user data 112 may further include a pressure map entry 204 to record a seating pressure map of the user 110 reflecting seating position and pressure distribution of the user 110. The pressure map entry 204 may include data collected from the sensors 106 such as pressure values, distribution, location or the like reflecting a seating condition of the user 110. The user data 112 may further include an anthropometric data entry 206 to record measurement and/or proportions of the body of the user 110 detected by the sensors 106. For instance, the anthropometric data entry 206 may include weight, height, hip width, shoulder width, waist width, thigh length, knee pivot to hip-point (H-point) distance, or the like. The user data 112 may further include a biomedical data entry 208 to record measurement of the user 110. For instance, the biomedical data entry 208 may include heart rate data, lung data (e.g. breath), and/or brain data (e.g. electroencephalography). The user data 112 may further include a usage entry 210 to record usage measurement associated with the user 110. For instance, the usage entry 210 may record usage of seatbelt and door open space associated with the user 110. The seatbelt usage may reflect wear on the bolster and cushions where the seat belt touches the fabric, which may help to predict wear and damages and improve material design for future designs. Similarly, the door open space may be related to ingress/egress wear on the seat cushion as in some instances, the user 110 may need to "slide" down the edge due to the door space, increasing wear on the cushion.

Figure 3:
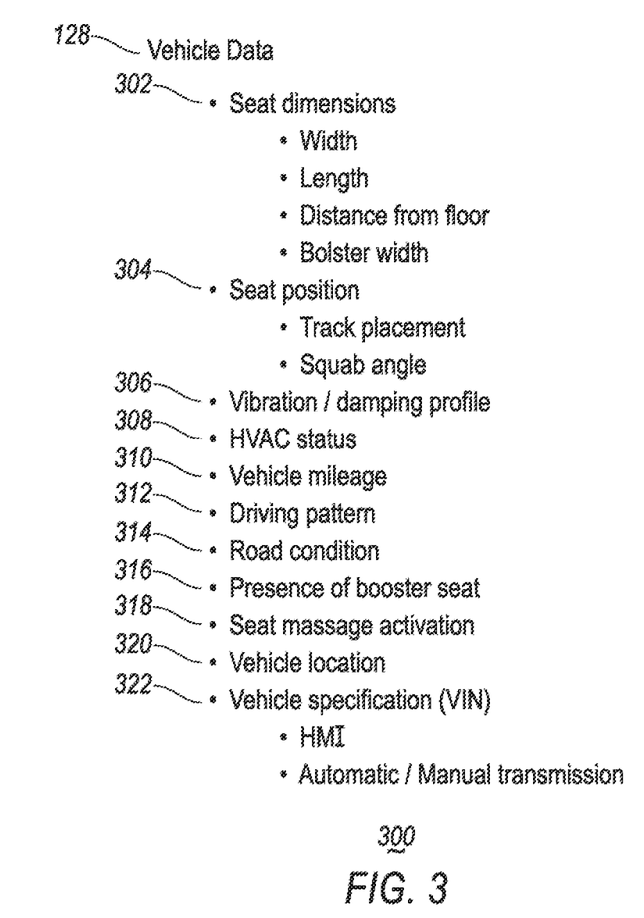
FIG. 3 illustrates an example diagram for vehicle data of one embodiment of the present disclosure.

Referring to FIG. 3, an example diagram 300 for user data of one embodiment of the present disclosure is illustrated. With continuing reference to FIGS. 1 and 2, the vehicle data 128 may include multiple entries to record various aspects of vehicle operations. For instance, the vehicle data 128 may include a seat dimensions entry 302 to record the dimensions of vehicle seats 102. The vehicle seats may include a driver seat, as well as any passenger seat within the vehicle 100. The seat dimensions entry may include a width, length, distance from floor, or bolster width of the vehicle seat 102. The vehicle data 128 may further include a seat position entry 304 to record position/configuration of the seat 102. As a few non-limiting examples, the seat position entry 304 may include track placement indicative of a sliding position of the seat 102 on a track, a seat squab angle, air bladder (for massage or posture) inflation level, pressure, or the like. The seat dimensions 302 and seat position 304 entries may be particular useful for adjustable seats to determine usage preference of vehicle seats 102 associated with each user 110. The vehicle data 128 may further include a vibration/damping profile 306 via signals detected by the sensors 130. The vehicle data 128 may further include a HVAC status/pattern entry 308 via signal collected from a HVAC controller (not shown) indicative of vehicle cooling/heating usage status/pattern. The vehicle data 128 may further include vehicle mileage entry 310 from a vehicle odometer indicative of a total mileage the vehicle 100 has been operated. The vehicle data 128 may further include a vehicle driving pattern 312 (e.g. short, long trips) and road condition entry 314 (e.g. normal, snow). The vehicle data 128 may further include an entry for presence of booster seats 316 detected via seat sensors 106 and/or seatbelt sensors 130. The vehicle data 128 may further include an entry for seat massage feature activation 318 indicative of the usage (e.g. time of the day, duration or the like) of one or more massage functions associated with the user 110. The vehicle data 128 may further include a vehicle location entry 320 configured to record/report vehicle location at a given time using location data from the GNSS controller 133. The vehicle data 128 may further include a vehicle specification entry 322 to record vehicle specifications. For instance, the vehicle specification entry 322 may include an HMI configuration (e.g. buttons on the steering wheel, voice control and etc.), automatic/manual transmission record or the like, which may affect vehicle wear. For instance, the availability of steering wheel buttons and voice control may reduce user forward and backward movement on the seat, and thus reducing seat wear and tear. Similarly, automatic transmission may reduce movement for the user left foot reducing seat wear.

Figure 4:
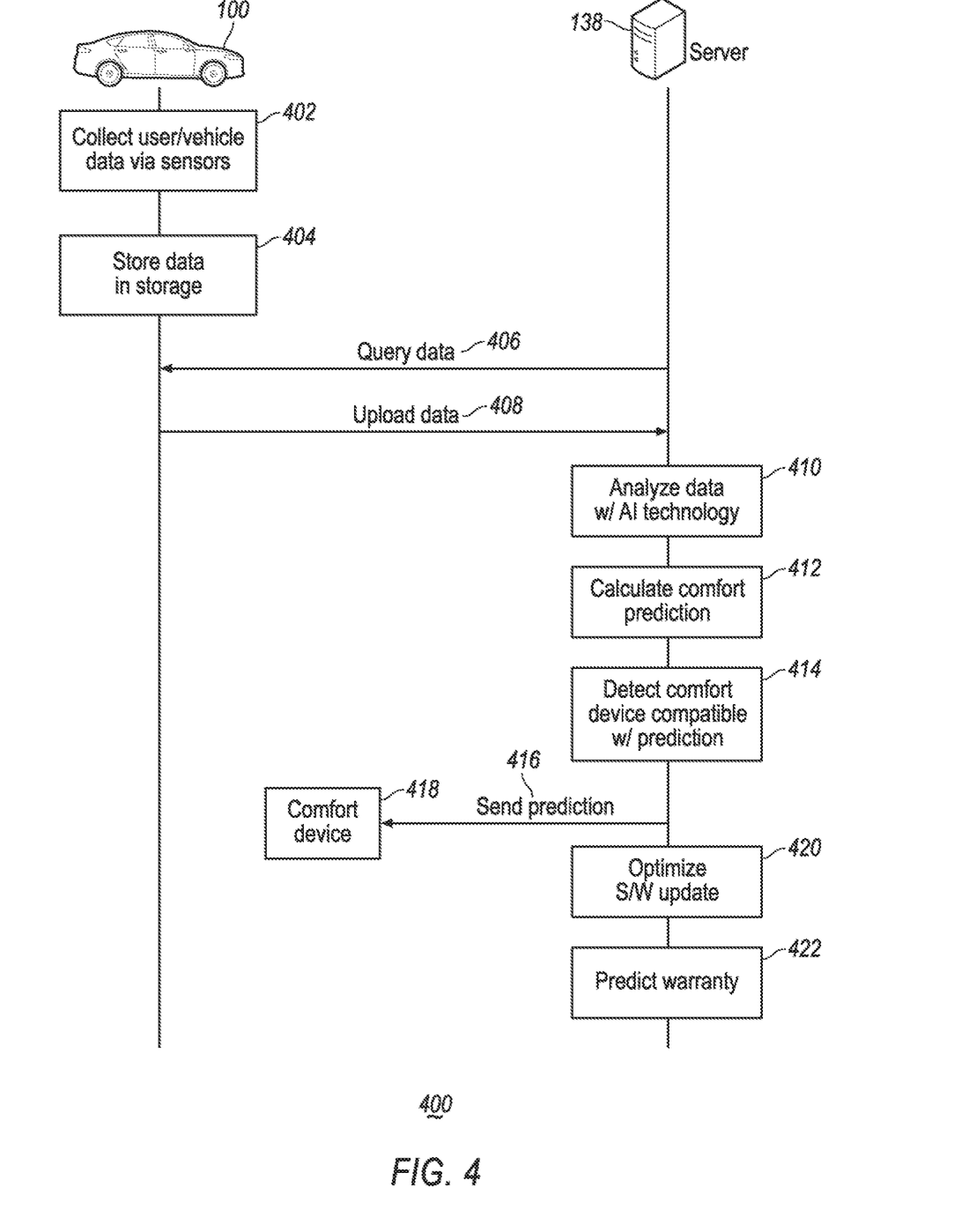
FIG. 4 illustrates an example data flow diagram of one embodiment of the present disclosure.

Referring to FIG. 4, an example data flow diagram for a process 400 of one embodiment of the present disclosure. With continuing reference to FIGS. 1 to 3, at operation 402, the vehicle 100 collects data via seat sensors 106 and vehicle sensors 130. In one example, the seat platform 102 and the computing platform 118 may be configured to operate separately by collecting user data 112 via seat sensors 106 and collecting vehicle data 128 via vehicle sensors 130 respectively. As another example, the seat platform 102 and the computing platform 118 may operate collectively to collect and store the user and vehicle data 112, 128. At operation 404, the vehicle 100 stores the collected user and vehicle data 112, 128 in the storage 114, 122. Here, similarly, the seat platform 102 and the computing platform 118 may store the data separately or collectively depending on the specific configuration of the vehicle 100. In some examples, the seat platform 102 may be provided with only limited storage capability. If this is the case, the user data 112 and the vehicle data 128 may be stored collectively in the storage 122 of the computing platform 118. The user data 112 and the vehicle data 128 may be stored in the storage 122 in a "black-box" manner for privacy protection. In this case, data collected by sensors may be encrypted before storage.

At operation 406, the server queries the user data 112 and vehicle data 128 from the vehicle 100. The server 138 may query all user data 112 and vehicle data 128 stored in the storage 122. Alternatively, the server 138 may query only a part of the user data 112 and vehicle data 128 by specifying conditions (e.g. time, entry name or the like) of data. Responsive to receiving the query, at operation 408 the computing platform 118 uploads the user data 112 and vehicle data 128 to the server 138 for processing and analysis. Alternatively, the computing platform 118 may be configured to automatically upload the user data 112 and vehicle data 128 to the server 138 in a real-time manner or periodically at a predefined interval without receiving queries from the server 138. In case the data received from the vehicle 100 is encrypted, the server 138 may be configured to decrypt the data first before starting to analysis.

At operation 410, responsive to receiving the user data 112 and vehicle data 128 from the vehicle 100, the server 138 analyze the data received using AI technologies (to be described in detail below). As a part of the data analysis, at operation 412, the server 138 may calculate a comfort prediction configured to operate comfort setting of comfort devices associated with the same user 110. For instance, by analyzing usage patterns of features such as HVAC status entry 308 and the seat massage activation entry 318 of the vehicle data 128, the server 138 may determine the comfort prediction associated with the user 110. The comfort prediction may apply to not only the vehicle setting, but also the compatible comfort devices in an office or home setting. For instance, a sofa provided with massage functions may be associated with the user 110 at home. Additionally, a home air-conditioner (AC) of the user 110 may be adjusted remotely. With the comfort prediction determined, the server 138 may operate those comfort devices (e.g. the sofa and AC) using the comfort prediction to provide the user 110 with better user experience. At operation 414, the server 138 detects the comfort devices and determines compatibility between the devices and comfort prediction. A comfort device may be fully or partially compatible with the comfort prediction. Continuing to use the example of a sofa mentioned above, for instance, the sofa may be provided with massage features, which are different from the massage features used by the user in the vehicle 100. In this type of partially compatible situation, the server 138 may further determine the sofa massage functions that are the most similar to those the user 110 used in the vehicle 100 to modify the comfort prediction. As an example, if the user uses waist and neck massage features in the vehicle 100 and the sofa is only provided with waist massage, the server 138 may modify the comfort prediction for the sofa to be waist massage only. At operation 416, the server 138 sends the comfort prediction (as original or modified) to the comfort devices 418.

In addition to the comfort prediction, the AI analysis of the server 138 may further optimize software updates to the vehicle system at operation 420. These operations may be based on analyzing a number of vehicles and obtaining extensive statistics of vehicle usage patterns. A vehicle identification number (VIN) of multiple vehicles 100 may be tracked and submitted to the server 138 as a part of vehicle data from each vehicle. The server 138 may determine software versions and available features of each vehicle through the VIN number as received. Through analyzing usage rate and pattern for features across a number of vehicles, the server 138 may determine an optimized software update version for current and future vehicle lineups based on the usage. For instance, if certain models of vehicle seats 102 are provided with multiple comfort features (e.g. five features) but the usage pattern determined by the server 138 indicates usage rate of different features varies by geographic locations, software update may be coordinated accordingly. For instance, the server 138 may push a vehicle software update to vehicle in the north to automatically activate seat heating when the cabin temperature is below a threshold determined by the usage pattern. Similarly, the server 138 may further push a vehicle software update to vehicle in the south to automatically activate seat cooling when the cabin temperature is above a threshold determined based on the usage pattern. At operation 422, the server 138 further predicts warranty/insurance claims based on the usage pattern determined. For instance, more heavily used features may increase the likelihood for warranty/insurance claims for vehicle components related to those features.

Figure 5:
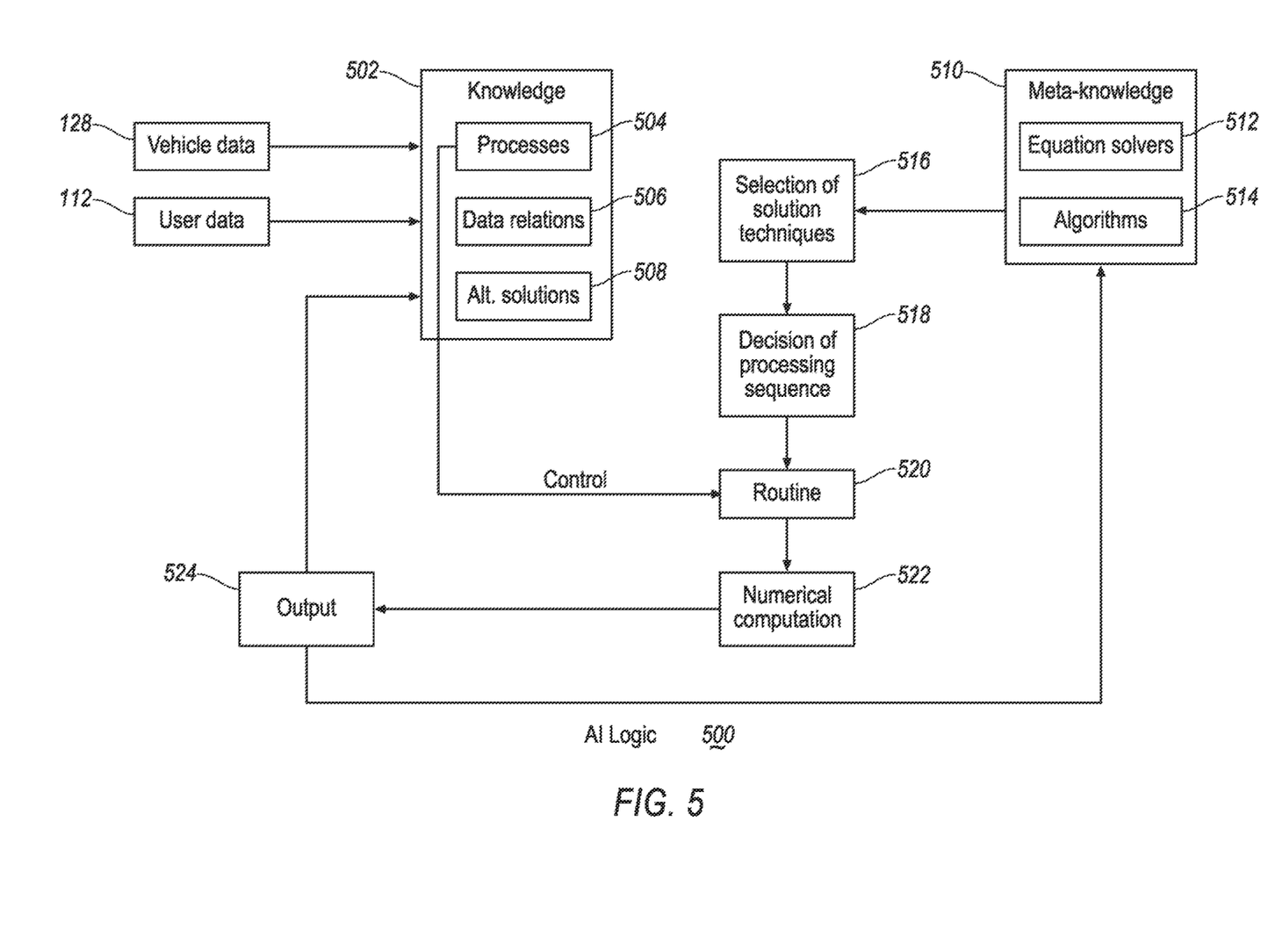
FIG. 5 illustrates an example block diagram of an AI logic of one embodiment of the present disclosure.

Referring to FIG. 5, an example AI logic block diagram 500 of one embodiment of the present disclosure is illustrated. The AI logic 500 may be implemented via a processor of the server 138 as an example. With continuing reference to FIGS. 1 to 4, a knowledge engine 502 receives user data 112 and the vehicle data 128 for processing and analysis. The knowledge engine 502 may include a process engine 504 configured to operation various processes of data analysis, a data relation engine 506 configured to evaluate and determine relationships of various data as received, and an alternative solution engine 508 configured to determine alternative solutions for comfort predictions, update optimizations, and/or warranty predictions. The AI logic 500 may further include a meta-knowledge engine 510 having an equation solver engine 512 configured to process mathematical solutions, and an algorithm engine 514 incorporating various AI algorithms for data processing. As a few non-limiting examples, the AI algorithms may include Neural Network, Data Classifiers, Linear Regression, Logistic Regression, Decision Tree, Support Vector Machine, Naïve Bayes, K-Nearest Neighbors, K-Means, Random Forest, Dimensionality Reduction, and/or Gradient Boosting and AdaBoost.

A selection of solution techniques 516 may be determined based on the meta-knowledge engine 510. At 518, the AI logic may make decisions on processing sequence based on the solution techniques 516 and processing results of the knowledge engine 502, and may operate processing routines at 520. The routines 520 may further take input from the process engine 504 to optimize the operation. processing results of the routine 520 may then be subject to numerical computation at 522 and eventually generates output results at 524. The AI logic may be configured to provide the output results 524 to the knowledge engine 502 and the meta-knowledge engine 510 as feedback to improve the processing operations.

In another embodiment, parallel AI logics can be deployed concurrently depending upon use case and timing. For instance, unsupervised methods like clustering and/or dimension reduction techniques can be deployed at the vehicle level and/or network level (e.g. server 138) to provide the real-time comfort predictions and enact countermeasures. Meanwhile, supervised techniques like classification and regression can occur at the network level to both handle warranty use cases as well as overall population comfort information for large scale adjustments to a fleet.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A server, comprising:
an interface, programmed to receive, from a plurality of vehicles, vehicle data indicative of vehicle status and user data indicative of usage of vehicle features by a plurality of users; and
a processor, programmed to
analyze the vehicle data and the user data using artificial intelligence (AI) logic to generate an analysis result indicative of a comfort prediction for the users, a first vehicle feature of the vehicle features being more often used by vehicles at a first location, and a second vehicle feature of the vehicle features being more often used by vehicles at a second location;
configure a comfort device associated with the users, external to the vehicles, using the comfort prediction;
pushing a first software update version to vehicles at the first location to automatically activate the first feature; and
pushing a second software update version to vehicles at the second location to automatically activate the second feature.

2. The server of claim 1, wherein the processor is further programmed to
query the vehicle data and the user data from the vehicle.

3. The server of claim 1, wherein the user data further includes: a user anthropometric entry indicative of a weight and height of the user.

4. The server of claim 3, wherein the user data further includes electroencephalography data of the user.

5. The server of claim 1, wherein the vehicle data includes a seat dimension entry, a seat position entry, and a seat massage activation entry.

6. The server of claim 5, wherein the vehicle data further includes at least one of: a vehicle vibration/damping entry, a heating, ventilation, and air conditioning entry, a vehicle mileage entry, a driving pattern entry, a road condition entry, a presence of booster seat entry, or a vehicle location entry.

7. The server of claim 1, wherein the comfort prediction includes at least one of a seat position setting, a seat massage setting, or a heating, ventilation, and air conditioning setting.

8. The server of claim 7, wherein the comfort device includes at least one of: a seat, or a building climate control system, and
the processor is further programmed to configure a second comfort device associated with the vehicle using the comfort prediction, the second comfort device being at least one of: a vehicle seat or a vehicle heating, ventilation, and air conditioning system.

9. The server of claim 1, wherein the processor is further programmed to
detect the comfort device is available; and
responsive to verifying the comfort device is compatible with the comfort prediction, configure the comfort device using the comfort prediction.

10. The server of claim 1, wherein the processor is further programmed to
analyze vehicle data and user data from multiple vehicles using the AI logic to generate an analysis result indicative a usage pattern of multiple vehicle features; and
select a version of software update based on the analysis result corresponding to the usage pattern of multiple vehicle features.

11. The server of claim 1, wherein the processor is further programmed to
predict a warranty claim based on the analysis result.

12. A method for a server, comprising:
receiving, from multiple vehicles, vehicle data indicative of vehicle status and user data indicative of usage of vehicle features by multiple users;
analyzing the vehicle data and the user data using artificial intelligence (AI) logic to generate an analysis result indicative of a usage pattern of multiple vehicle features, wherein the usage pattern is indicative of a first vehicle feature of the vehicle features being more often used by vehicles at a first location, and a second vehicle feature of the vehicle features being more often used by vehicles at a second location;
pushing a first software update version to vehicles at the first location to automatically activate the first feature; and
pushing a second software update version to vehicles at the second location to automatically activate the second feature.

13. The method of claim 12, further comprising:
predicting a warranty claim based on the analysis result.

14. The method of claim 12, further comprising:
configuring a comfort device associated with at least one user, external to the vehicle using the analysis result.

15. The method of claim 14, wherein the comfort device includes at least one of: a seat, or a building climate control system.

16. The method of claim 12, further comprising:
configuring a second comfort device associated with the vehicle using the analysis result, the second comfort device being at least one of: a vehicle seat or a vehicle heating, ventilation, and air conditioning system.

17. A non-transitory computer-readable medium, comprising instructions that, when executed by a processor of a computer, cause the processor to:
query vehicles for vehicle data indicative of vehicle status and user data indicative of usage of vehicle features by multiple users;
responsive to receiving, from the vehicles, the vehicle data and the user data, analyze the vehicle data and the user data using artificial intelligence (AI) logic to generate an analysis result indicative a usage pattern of multiple vehicle features by the users, wherein the usage pattern is indicative of a first vehicle feature of the vehicle features being more often used by vehicles at a first location, and a second vehicle feature of the vehicle features being more often used by vehicles at a second location; and
output a warranty claim prediction based on the usage pattern of the multiple vehicle features.

18. The non-transitory computer-readable medium of claim 17, further comprising instructions that, when executed by the processor of the computer, cause the processor to:
pushing a first software update version to vehicles at the first location to automatically activate the first feature; and
pushing a second software update version to vehicles at the second location to automatically activate the second feature.

19. The non-transitory computer-readable medium of claim 17, wherein the analysis result is further indicative of a comfort prediction for at least one user,
the non-transitory computer-readable medium further comprising instructions, when executed by a processor of a computer, cause the computer to:
configure a comfort device associated with the user, external to the vehicles, using the comfort prediction.

20. The non-transitory computer-readable medium of claim 19, wherein the comfort device includes at least one of: a seat, or a building climate control system.

* * * * *